United States Patent Office 3,778,446
Patented Dec. 11, 1973

3,778,446
2-SUBSTITUTED - 4,5-DICYANOIMIDAZOLES AND THEIR PREPARATION FROM DIAMINOMALEONITRILE
Frank J. Weigert, Wilmington, Del., assignor to E. I. du Pont de Nemours and Company, Wilmington, Del.
No Drawing. Filed July 23, 1971, Ser. No. 165,747
Int. Cl. C07d 49/36
U.S. Cl. 260—309
15 Claims

ABSTRACT OF THE DISCLOSURE

Described are 2-substituted-4,5-dicyanoimidazoles, e.g., 2-ethoxy-4,5-dicyanoimidazole, and their preparation by heating a Compound III of the formula

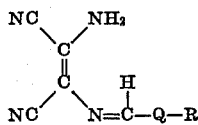

where Q is O or S and R is hydrocarbyl, in an oxidizing medium, e.g., a benzoquinone. The new compounds are useful as buffering agents. Compound III may be prepared, e.g., from diaminomaleonitrile by the method of Woodward, U.S. Pat. 2,534,331.

BACKGROUND OF THE INVENTION

(1) Field of the invention

This invention is concerned with a new class of substituted imidazoles, their use as chemical buffers and their preparation from diaminomaleonitrile.

(2) Prior art

U.S. Pat. 2,534,331 to D. W. Woodward, the closest art known, shows the reaction of diaminomaleonitrile with ethyl orthoformate, accompanied by loss of two molecules of ethanol, to yield an open chain crystalline compound of formula $C_7H_8N_4O$. When this product is heated with water, diaminomaleonitrile is recovered. When the product is heated in xylene, it loses another molecule of ethanol to yield 4,5-dicyanoimidazole.

STATEMENT OF THE INVENTION

It has now been discovered that when diaminomaleonitrile(I) reacts with an orthoformate or a trithioorthoformate(II), the first (or intermediate) product formed is an α-hydrocarbyloxy- or α-hydrocarbylthiomethyleneamino-β-aminomaleonitrile of Formula III as shown in Equation A (Woodward) where Q may be O or S, and R is hydrocarbyl or substituted hydrocarbyl:

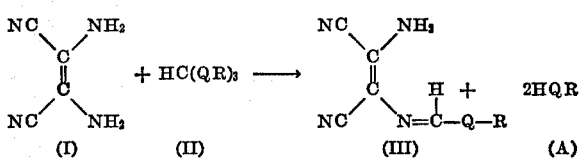

When a compound of Formula III is heated under oxidizing conditions, the hydrocarbyloxy, hydrocarbylthio, substituted hydrocarbyloxy or substituted hydrocarbylthio group —Q—R is not lost but the product obtained is a 2-hydrocarbyloxy-, 2-hydrocarbylthio-, 2-substituted hydrocarbyloxy- or 2-substituted hydrocarbylthio-4,5-dicyanoimidazole(IV) as shown in Equation B, in which Q and R are defined as above,

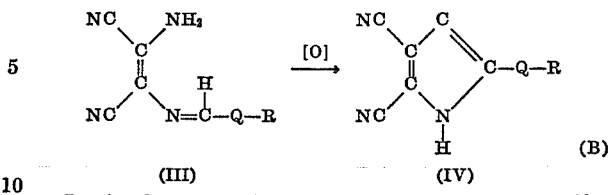

In the formulas above, Q may be oxygen or sulfur and R is hydrocarbyl or substituted hydrocarbyl. All known hydrocarbyl groups are operable for R in Formula IV. For example, R may be alkyl of 1–18 carbon atoms, alkenyl of 3–18 carbon atoms, cycloalkyl (including bicycloalkyl and tricycloalkyl) of 3–18 carbon atoms, aryl of 6–18 carbon atoms, arylalkyl of 7–18 carbon atoms, alkaryl of 7–18 carbon atoms, alkaralkyl of 8–18 carbon atoms.

Substituents on the hydrocarbyl groups in R may include halogen (F, Cl, Br or I), alkoxy of up to 18 carbon atoms, aryloxy of up to 18 carbon atoms, amino, lower alkylamino, di(loweralkyl)amino, carbonyl (e.g., aldehyde or ketone functions), cyano or nitro. By lower-alkyl is meant an alkyl group of 6 carbon atoms or less. Preferably, there will be no more than 3 such substituents to any hydrocarbyl group R with no more than 18 carbons in any substituent.

The hydrogen in Formula IV is acidic and is the source of the buffering activity against bases which is characteristic of all compounds of Formula IV. When compounds of Formula IV react with bases such as metals, metal oxides, and metal hydroxides, the corresponding metal salts are formed as a result of the buffering action. These metal salts in turn are useful as buffers against acids. The products of the invention therefore include compounds of Formula V, where Q and R are defined as above and M is hydrogen or one equivalent of a metal.

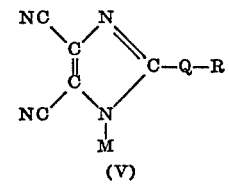

By metal is meant any element of atomic number 3, 4, 11–13, 19–32, 37–51, 55–84, and 87–103 and above. Alkali and alkaline earth metals are preferred.

The process of Equation A may be carried out neat, i.e., without any added reactants, solvents, diluents, or the like. However, for greatest convenience, it is preferred to carry out the reaction in the presence of an organic liquid which is chemically inert to the reactants and products. Preferably, the reaction medium is substantially free of water (i.e., less than 0.1%), is capable of dissolving the reactants and boils at least 20° C. above the boiling point of the particular compound HQR, which is formed as a by-product in the process. Suitable liquids include ethers, such as anisole, phenetole, dibutyl ether and dioxane, nitriles such as propionitrile, butyronitrile and benzonitrile, esters such as ethyl acetate, butyl acetate and diethyl succinate, and hydrocarbons such as toluene and xylene. Weights of reaction medium up to 25 and more times the weight of diaminomaleonitrile may conveniently be used.

The molar proportions of diaminomaleonitrile and orthoformate which are brought together to carry out the reaction of Equation A may be varied widely, i.e., from 20:1 to 1:20, since any proportions used will yield at least some of the compound of Formula III. Equimolar proportions are preferred. The temperature for carrying out the reaction of Equation A may be in the range of 0–180° C. and is preferably in the range from 70–125° C. The temperature is preferably selected so that the by-product HQR can be removed by distillation. The distillation is preferably continued until two equivalents of HQR have been collected, after which further heating is to be avoided.

The products of Formula III may be recovered from the reaction mixture by known means such as evaporation, crystallization, distillation, chromatography, and the like, and may, if desired, be purified by such means as recrystallization, sublimation, and the like. Alternatively, compounds of Formula III may be reacted further without isolation or purification by adding an oxidizing agent directly to the reaction mixture from Equation A.

For the oxidative ring closure of Equation B, a wide variety of inorganic and organic oxidizing agents may be employed. Thus, there may be employed 2,3-dichloro-5,6-dicyanobenzoquinone, N-bromosuccinimide, N-bromophthalimide, N-bromourea, tetrabromoglycoluril and N-chlorosuccinimide and oxidants of similar oxidizing strength.

The reaction of Equation B may be carried out neat. Where the reactants are solids, this may be accomplished by impact grinding as in a ball mill. Preferably, the reaction is carried out in the presence of an organic liquid which is inert to the reactants and products, and particularly one which is resistant to oxidation. Thus, there may be employed nitriles such as acetonitrile and benzonitrile, esters such as ethyl acetate and methyl propionate, ethers such as diethyl ether, tetrahydrofuran, dioxane, and the like, and hydrocarbons such as hexane, benzene, toluene, and the like.

The reaction of Equation B is preferably carried out in the temperature range between −20 and +150° C. It is preferred to operate at the boiling point of the reaction medium if one is employed.

The molecular proportion of oxidant to the compound of Formula III may be varied widely, e.g., from 20:1 to 1:20, since any proportions will yield at least some of the imidazole product. For best results, approximately equimolar proportions are employed.

The 2-substituted-4,5-dicyanoimidazole product may be recovered from the reaction mixture by known means such as evaporation, crystallization, distillation, chromatography, and the like. When desired, the product may be purified by known means such as recrystallization, sublimation, and the like. The product of Formula IV are colorless crystalline compounds.

Compounds of Formula III in which the R group contains three or more carbon atoms may be prepared by an alternative procedure in which diaminomaleonitrile is reacted with a mixture of a compound of Formula II in which R contains one or two carbon atoms with an alcohol or thiol containing three or more carbon atoms. This can be shown in Equation C:

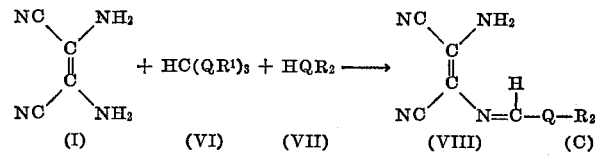

in which Q is defined as above, R' is methyl or ethyl, and R² is propyl, substituted propyl or a higher hydrocarbyl or substituted hydrocarbyl group. The conditions for carrying out the reaction of Equation C are the same as those described above for carrying out the reaction of Equation A with the added preference that Compounds I and VI be employed in approximately equimolar amounts and Compound VII be employed in equal amount or up to twenty times as great an amount as the other two.

No added reactants are necessary for carrying out the reaction of Equation C. However, yields are employed if a catalytic amount of an acid catalyst having a pKa of less than 2 is added. The amount of the catalyst may vary from 0.001 to 1 equivalent per equivalent of diaminomaleonitrile and is preferably within the range of 0.01 to 0.1 equivalent of acid per equivalent of diaminomaleonitrile. Suitable acids include oxalic acid, toluene sulfonic acid, and trifluoroacetic acid.

In the examples which follow, parts are by weight unless otherwise indicated.

EXAMPLE 1

2-ethoxy-4,5-dicyanoimidazole

Part A.—A solution of 20 g. of diaminomaleonitrile in 250 ml. of dioxane was heated in a 500-ml. flask fitted with an addition funnel and a distilling column. The solvent was allowed to distill slowly during one-half hour while 28 g. of ethyl orthoformate was added, the distillation temperature being in the range of 80–90° C. during this time. Distillation was continued another half hour until the stillhead temperature reached 100° C. and about 150 ml. of liquid had distilled. The reaction mixture was cooled to room temperature, diluted with 100 ml. of hexane, cooled to 0° C. and the precipitated solid removed by filtration. There was obtained 20.5 g. of α-ethoxymethylenamino-β-aminomaleonitrile in the form of colorless crystals melting at 134–136° C.

Part B.—A solution of 5.5 g. of α-ethoxymethylenamino-β-aminomaleonitrile and 6.4 g. of 2,3-dichloro-5,6-dicyanobenzoquinone in 100 ml. of acetonitrile was stirred and heated at reflux for 4 days. The reaction mixture was cooled and 20 g. of a neutral silica gel absorbent (Silicar® CC–7) was added. Volatiles were stripped in a rotary evaporator. Elution with methylene chloride yielded a yellow solid. This was recrystallized from 200 ml. of hot water to yield 3.0 g. of 2-ethoxy-4,5-dicyanoimidazole in the form of colorless crystals melting at 98–99° C. It was identified by its NMR and infrared absorption spectra.

*Analysis.*—Calcd. for $C_7H_6N_4O$ (percent): C, 51.9; H, 3.7; N, 34.6. Found (percent): C, 51.5; H, 3.8; N, 34.8.
IR (Nujol) 3.0, 3.7, 4.45, 6.1, 6.2, 6.8, 6.9, 7.2, 7.35, 7.6, 9.25, 9.4, 9.85 9.9, 10.0, 10.1 13.1, 13.6.
NMR ($CDCl_3$/TMS) $\delta$=1.45, triplet, J=7, $CH_3$; $\delta$=3.88, quartet, J=7, $CH_2$; $\delta$=10.3, broad singlet, $NH$.
UV ($CH_3CN$) $\lambda_{max}$=2660 nm. ($\epsilon$=11,550).

EXAMPLE 2

2-allyloxy-4,5-dicyanoimidazole

Part A.—To a slowly distilling solution of 32.4 g. of diaminomaleonitrile in 250 g. of dioxane was added dropwise 55.0 g. of triallyl orthoformate. Heating was continued until 200 ml. had been collected. The solution was cooled to room temperature, and the precipitate which formed was collected by filtration and recrystallized from a mixture of ether/tetrahydrofuran/petroleum ether to give 18.8 g. of α-allyloxymethyleneamino-β-aminomaleonitrile, M.P. 125° C. The sample darkened on standing.

IR (Nujol): 2.9, 3.0, 3.15, 4.45, 4.5, 6.1, 6.2, 8.0, 8.1, 8.3, 8.55, 10.0, 10.45, 10.6, 10.8, 11.2, 12.4μ.
NMR ($CDCl_3$/TMS): $\delta$=8.01, singlet, CH; $\delta$=6.0, broad, =CH, $\delta$=5.33, multiplet, =$CH_2$; $\delta$=4.67, doublet, J=5, $CH_2$; $\delta$=4.7, broad singlet, $NH_2$

*Analysis.*—Calcd. for $C_8H_8N_4O$ (percent): C, 54.5; H, 4.6; N, 31.8. Found (percent): C, 54.2; H, 4.6; N, 32.3.

Part B.—A solution of 8 g. of α-allyloxymethylenamino-β-aminomaleonitrile and 9 g. of 2,3-dichloro-5,6-dicyanobenzoquinone in 150 ml. of acetonitrile was refluxed for 17 hours. The resulting solution was preadsorbed on 20 g. of a neutral silica gel absorbent (Silicar® CC–7) and chromatographed. Elution with methylene chloride gave a yellow solid which was recrystallized from 150 ml. of water to give 2.2 g. of colorless 2-allyloxy-4,5-dicyanoimidazole, M.P. 95–97° C.

IR (Nujol): 3.1, 3.2, 4.43, 6.3, 6.48, 7.6, 7.8, 7.9, 8.8, 9.2, 9.45, 9.9, 10.35, 10.68, 10.8, 12.1μ.

NMR (DMSO-$d_6$): $\delta=7.25$, broad peak, (NH+$H_2O$); $\delta=6.13$, multiplet, =CH; $\delta=5.48$, doublet J=18, multiplet J=1, =CH trans; $\delta=5.57$, doublet J=8, multiplet J=1, =CH cis; $\delta=5.02$, doublet J=6, $CH_2$.

Analysis.—Calcd. for $C_8H_6N_4O$ (percent): C, 55.2; H, 3.4; N, 32.2. Found (percent): C, 54.3; H, 3.4; N, 32.4.

EXAMPLE 3

2-methoxy-4,5-dicyanoimidazole

Part A.—To a slowly distilling solution of 32.4 g. of diaminomaleonitrile in 250 ml. of dioxane was added dropwise 31.7 g. of trimethyl orthoformate. Heating was continued until 20 ml. of distillate had been collected. The precipitate which formed in the reaction mixture on cooling was recrystallized from tetrahydrofuran/pentane to yield 29 g. of α-methoxymethyleneamino-β-aminomaleonitrile in the form of colorless crystals melting at 134° C.

Part B.—A solution of 4.0 g. of α-methoxymethylamino-β-aminomaleonitrile and 5.1 g. of 2,3-dichloro-5,6-dicyanobenzoquinone in 150 ml. of acetonitrile was heated at reflux for one day. About 20 g. of a neutral silica gel absorbent (Silicar® CC–7) was added and volatiles were stripped in a rotary evaporator. Elution with methylene chloride gave 0.9 g. of a yellow solid. This was recrystallized from hot water to yield 2-methoxy-4,5-dicyanoimidazole in the form of colorless crystals melting at 134–136.5° C.

EXAMPLE 4

2-cyclohexyloxy-4,5-dicyanoimidazole

Part A.—Into a 500-ml. 3-neck flask equipped with magnetic stirrer, addition funnel and distilling head was placed 16.8 g. diaminomaleonitrile (0.15 mol), 25 g. of cyclohexanol (0.25 mol) and 125 ml. of dioxane. The flask was heated to slowly distill the dioxane while 22.2 g. of triethyl orthoformate (0.15 mol) was added dropwise over a period of 3 hours. After 100 ml. had distilled, the reaction mixture was cooled and preadsorbed on 20 g. of a synthetic magnesia silica gel absorbent (Florosil®). Elution with benzene gave an oil which slowly crystallized to give 7 g. of α-cyclohexyloxymethylenamino-β-aminomaleonitrile. The infrared spectrum showed bands at 2.9, 3.0, 3.2, 3.4, 3.5, 4.45, 4.5, 6.1, 6.2, 6.9, 7.35, 7.9, 9.4, 10.35, 11.254μ. The NMR spectrum ($CDCl_3$/TMS) showed absorptions for the cyclohexyl protons between $\delta=1$ and 2.2, the methyne proton at $\delta=4.7$ and the =CH at $\delta=8.0$.

Part B.—A solution of 6.6 g. of α-cyclohexyloxymethylenamino-β-aminomaleonitrile and 5.7 g. of 2,3-dichloro-5,6-dicyanobenzoquinone in 250 ml. of acetonitrile was heated at reflux for about 18 hours. It was preadsorbed on 10 g. of a synthetic magnesia silica bel (Florosil®) and eluted with choloroform to obtain 3.0 g. of crystalline 1-cyclohexyloxy-4,5-dicyanoimidazole melting at 155–155.5° C. after recrystallization from ethanol-water.

IR (Nujol), band at 3.1–3.8μ; peaks at 3.75, 4.5, 6.3, 6.5, 7.4, 7.5, 7.7, 8.0, 8.9, 9.45, 9.9, 10.6, 11.2, 13.9μ.

NMR ($CDCl_3$/TMS) $\delta=1.1$–2.2, broad singlet; $\delta=5.0$, very broad; $\delta=6.6$.

EXAMPLE 5

2-dodecyloxy-4,5-dicyanoimidazole

Part A.—In the general procedure of Example 4, Part A, 10.6 g. of trimethyl orthoformate was slowly added to a gently distilling solution of 10.8 g. of diaminomaleonitrile, 18.6 g. of dodecanol and 1 g. of oxalic acid in 150 ml. of dioxane. The reaction product was chromatographed on a synthetic magnesia silica gel (Florosil®). Elution with benzene and methylene chloride yielded 6.0 g. of α-dodecyloxymethylenamino-β-aminomaleonitrile in the form of colorless crystals melting at 109–110° C.

Part B.—A solution of 2 g. of α-dodecyloxymethylenamino-β-aminomaleonitrile and 1.3 g. of 2,3-dichloro-5,6-dicyanobenzoquinone in 50 ml. of acetonitrile was heated at reflux for two days. The reaction mixture was cooled to room temperature and absorbed on 5 g. of a synthetic magnesia silica gel (Florosil®). Elution with benzene gave 1.0 g. of 2-dodecyloxy-4,5-dicyanoimidazole as colorless crystals, M.P. 45° C. The infrared spectrum showed bands at 3.1, 3.4, 3.5, 4.4, 6.3, 6.5, 6.8, 6.9, 7.3, 7.6, 9.4 and 10.4μ.

NMR ($CDCl_3$/TMS). $\delta=0.9$, triplet, J=7, $CH_3$; $\delta=1.28$, singlet $CH_2$; $\delta=4.45$, triplet, J=6.5, $OCH_2$.

EXAMPLE 6

2-undecylenyloxy-4,5-dicyanoimidazole

Part A.—In the general procedure of Example 4, Part A, 22.2 g. of triethyl orthoformate was added to a gently distilling solution of 16.2 g. of diaminomaleonitrile, 25.2 g. of ω-undecylenyl alcohol and 1.0 g. of oxalic acid in 250 ml. of dioxane. The reaction product was chromatographed on a synthetic magnesia silica gel (Florosil®). Elution with benzene yielded 7.8 g. of α-undecenyloxymethylenamino-β-aminomaleonitrile in the form of colorless crystals, M.P. 95° C.

Part B.—A solution of 5.7 g. of α-undecenyloxymethylenamino-β-aminomaleonitrile and 3.8 g. of 2,3-dichloro-5,6-dicyanobenzoquinone in 200 ml. of acetonitrile was heated at reflux for 1 day. The reaction mixture was cooled to room temperature and absorbed on 10 g. of a synthetic magnesia silica gel (Florosil®). Elution with benzene gave 1 g. of 2-undecenyloxy-4,5-dicyanoimidazole in the form of a yellow oil. The infrared spectrum showed bands at 3.1, 3.3, 3.45, 3.55, 3.8, 4.5, 6.1, 6.3, 6.5, 6.8, 6.95, 7.3, 7.65, 8.8, 9.4, 10.0, 10.4, 10.9, 12.3, 13.1, 13.2 and 14.2μ.

NMR ($CDCl_3$/TMS): $\delta=1.33$, singlet $CH_2$, $\delta=2.12$, broad, $OCH_2CH_2$—; $\delta=4.47$, triplet J=6, $OCH_2$; $\delta=4.85$–5.15 AB of ABX, vinyl: $\delta=5.68$, X of ABX, vinyl; $\delta=6.44$ NH.

EXAMPLE 7

2-benzyloxy-4,5-dicyanoimidazole

Part A.—In the general procedure of Example 4, Part A, 23 g. of triethyl orthoformate was added to a gently distilling solution of 16.2 g. of diaminomaleonitrile, 16.2 g. of benzyl alcohol and 1.2 g. of oxalic acid in 250 ml. of dioxane. The reaction product was chromatographed on a synthetic magnesia silica gel (Florosil®). Elution with benzene yielded 8.2 g. of α-benzyloxymethylenamino-β-aminomaleonitrile in the form of colorless crystals, MP 141° C.

Part B.—A solution of 8 g. of α-benzyloxymethylenamino-β-aminomaleonitrile and 7 g. of 2,3-dichloro-5,6-dicyanobenzoquinone in 150 ml. of acetonitrile was heated at reflux for 2 days. The reaction mixture was cooled to room temperature and absorbed on 10 g. of a synthetic magnesia silica gel (Florosil®). Elution with methylene chloride gave 1 g. of 2-benzyloxy-4,5-dicyanoimidazole in the form of a light colored crystal, melting at 162–163° C.

The infrared spectrum showed bands at 3.1, 3.2, 4.45, 6.2, 6.3, 6.5, 7.6, 9.35, 10.55, and 13.45μ.

NMR ($CDCl_3$/TMS): $\delta=5.39$, singlet $OCH_2$; $\delta=7.38$, singlet $C_6H_5$.

EXAMPLE 8

Sodium salt of 2-ethoxy-4,5-dicyanoimidazole

To 2 g. of 2-ethoxy-4,5-dicyanoimidazole in 5 ml. of water was added with stirring 1.05 g. of sodium bicarbonate in 15 ml. of water. A gas was evolved. The solution was stirred at room temperature for 17 hours, treated with decolorizing charcoal (Darco®), and the water removed on a rotary evaporator. The residue was dissolved in tetrahydrofuran and the solvent again removed giving 2.2 g. of the sodium salt of 2-ethoxy-4,5-dicyanoimidazole, MP >275° C. The infrared spectrum showed bands at 4.45, 6.6, 7.05, 7.4, 7.6, 8.8, 9.2, 9.3, 9.7, 9.8, 10.9, 13.0 and 13.2.

EXAMPLE 9

A solution of 4.1 g. of α-ethoxymethylenamino-β-aminomaleonitrile and 4.5 g. of N-bromosuccinimide in 100 ml. of acetonitrile was heated at reflux for 2 hours. The solution was pre-adsorbed on a synthetic magnesia silica gel (Florosil®). Elution with methylene chloride gave 2-ethoxy-4,5-dicyanoimidazole which was identical with the product of Example 1, Part B.

All of the compounds of Formula V are useful as chemical buffers in alcohol/water systems. This is illustrated as follows:

EXAMPLE A 2-ethoxy-4,5-dicyanoimidazole (0.5 g.) was dissolved in a mixture of 25 ml. of methanol and 25 ml. of water. The pH was observed by a pH meter (Corning®, Model 7) to be 3.1. The solution was then titrated with 0.1 N sodium hydroxide with the following results:

| Base added (ml.): | pH |
|---|---|
| 0 | 3.1 |
| 1 | 3.5 |
| 3 | 3.9 |
| 5 | 4.1 |
| 7 | 4.3 |
| 11 | 4.6 |
| 15 | 4.9 |
| 20 | 5.3 |
| 25 | 6.0 |
| 26 | 6.7 |

The solution (containing the ionized 1-sodio salt of 2-ethoxy-4,5-dicyanoimidazole) was then back-titrated with 0.1 N hydrochloric acid with the following results:

| Acid added (ml.): | pH |
|---|---|
| 1.5 | 6.5 |
| 6.5 | 5.5 |
| 11.5 | 4.9 |
| 16.5 | 4.6 |
| 21.5 | 4.2 |
| 26.5 | 3.5 |
| 31.5 | 2.7 |

This shows that 2-ethoxy-4,5-dicyanoimidazole is a useful buffer for acids and bases in the pH range 3–5. In contrast, a mixture of 25 ml. of methanol and 25 ml. of water showed no buffering action when titrated with 0.1 N sodium hydroxide and back-titrated with 0.1 N hydrochloric acid as follows:

| Base added (ml.): | pH |
|---|---|
| 0 | 7.8 |
| 1 | 11.3 |
| 2 | 11.8 |
| 3 | 11.9 |
| 4 | 12.0 |

| Acid added (ml.): | |
|---|---|
| 1 | 11.8 |
| 2 | 11.6 |
| 3 | 11.2 |
| 4 | 5.5 |
| 5 | 3.0 |
| 6 | 2.8 |
| 8 | 2.5 |

When lithium, potassium, rubidium and strontium hydroxides are employed in place of sodium hydroxide, the corresponding lithium, potassium, rubidium and strontium salts of 2-ethoxy-4,5-dicyanoimidazole are obtained. Other metal salts are prepared from these by metathesis.

When the orthoformates and trithioorthoformates shown in Table I below are substituted for triethyl orthoformate in the procedure of Example 1 or for triallyl orthoformate in the procedure of Example 2, the indicated 2-substituted-4,5-dicyanoimidazoles are obtained.

TABLE I

| Item | Orthoformate | Product (4,5-dicyanoimidazole) |
|---|---|---|
| 1 | Triisopropyl | 2-isopropyloxy- |
| 2 | Triisobutyl | 2-isobutyloxy- |
| 3 | Tricyclohexyl | 2-cyclohexyloxy- |
| 4 | Tri(2-ethylhexyl) | 2-(2-ethylhexyloxy)- |
| 5 | Trioctyl | 2-octyloxy- |
| 6 | Tribenzyl | 2-benzyloxy- |
| 7 | Trimesityl | 2-mesityloxy- |
| 8 | Triphenyl | 2-phenoxy- |
| 9 | Tri(2-naphthyl) | 2-(2-naphthoxy)- |
| 10 | Tri(o-tolyl) | 2-(o-tolyl)- |
| 11 | Tri(tribromophenyl) | 2-tribromophenoxy- |
| 12 | Tri(o-nitrophenyl) | 2-(o-nitrophenoxy)- |
| | Trithioorthoformate | |
| 13 | Trimethyl | 2-methylthio- |
| 14 | Triethyl | 2-ethylthio- |
| 15 | Triallyl | 2-allylthio- |
| 16 | Tributyl | 2-butylthio- |
| 17 | Triphenyl | 2-phenylthio- |
| 18 | Tribenzyl | 2-benzylthio- |
| 19 | Tri(α-naphthyl) | 2-(α-naphthylthio)- |
| 20 | Tri(p-chlorophenyl) | 2-(p-chlorophenylthio)- |

When the alcohols and thiols shown in Table II below are substituted for cyclohexanol in the procedure of Example 4 or for dodecanol in the procedure of Example 5, the indicated 2-substituted-4,5-dicyanoimidazoles are obtained.

TABLE II

| Item | Alcohol or thiol | Product (4,5-dicyanoimidazole) |
|---|---|---|
| 1 | 6,6,6-trifluorohexanol | 2-(6,6,6-trifluorohexylosy)- |
| 2 | 10,11-dibromoundecanol | 2-(10,11-dibromoundecyloxy)- |
| 3 | 10-bromoundecanol | 2-(10-bromoundecyloxy)- |
| 4 | 10,11-dichloroundecanol | 2-(10,11-dichloroundecyloxy)- |
| 5 | 10-chloroundecanol | 2-(10-chloroundecyloxy)- |
| 6 | 10-iodoundecanol | 2-(10-iodoundecyloxy)- |
| 7 | 6-cyanohexanol | 2-(6-cyanohexyloxy)- |
| 8 | 6-nitrohexanol | 2-(6-nitrohexylosy)- |
| 9 | 2-methoxyethanol | 2-(2-methoxyethoxy)- |
| 10 | β-Phenoxyethanol | 2-(c-phenoxyethosy)- |
| 11 | β-Methoxy-(β-ethoxy)ethanol | 2-(c-methoxy[c-ethoxy)ethosy)- |
| 12 | 10-aminoundecanol | 2-(10-aminoundecyloxy)- |
| 13 | 10-(dimethylamino)undecanol | 2-(10[dimethylamino]undecyloxy)- |
| 14 | m-(Dimethylamino)phenol | 2-(m-[dimethylamino]phenoxy)- |
| 15 | 2,3-dibromopropylthiol | 2-(2,3-dibromopropylthio)- |

Since obvious modifications and equivalents in the invention will be evident to those skilled in the chemical arts, I propose to be bound solely by the appended claims.

The embodiment of the invention in which an exclusive property or privilege is claimed are defined as follows:

1. A compound of the formula

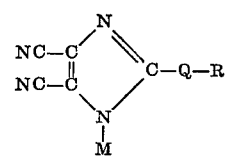

Q is O or S;
M is hydrogen or alkali or alkaline earth metal; and
R is: alkyl of 1–18 carbon atoms; alkyl of 1–18 carbon atoms mono-, di- or tri-substituted with halogen or lower alkoxy or mono-substituted with cyano, nitro, amino, di(loweralkyl)amino or phenoxy; alkenyl of 3–18 carbon atoms; cyclohexyl; or phenyl.

2. The compound of claim 1 named 2-ethoxy-4,5-dicyanoimidazole.

3. The compound of claim 1 named 2-allyloxy-4,5-dicyanoimidazole.

4. The compound of claim 1 named 2-methoxy-4,5-dicyanoimidazole.

5. The compound of claim 1 named 2-cyclohexyloxy-4,5-dicyanoimidazole.

6. The compound of claim 1 named 2-dodecyloxy-4,5-dicyanoimidazole.

7. The compound of claim 1 named 2-undecylenyloxy-4,5-dicyanoimidazole.

8. The compound of claim 1 named 2-benzyloxy-4,5-dicyanoimidazole.

9. The compound of claim 1 named the sodium salt of 2-ethoxy-4,5-dicyanoimidazole.

10. The process of preparing a compound of claim 1 in which M is H which comprises heating a β-aminomaleonitrile of the formula

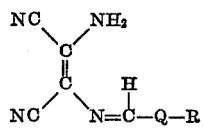

wherein Q and R are as in claim 1, at a temperature in the range −20 to +150° C.,
in the presence of
an oxidizing agent of the group consisting of 2,3-dichloro-5,6-dicyanobenzoquinone and N-bromosuccinimide.

11. The process of claim 10 wherein the β-aminomaleonitrile is α-allyloxymethyleneamino-β-aminomaleotrile.

12. The process of claim 10 wherein the β-aminomaleonitrile is α-allyloxymethyleneamino-β-aminomaleonitrile.

13. The process of claim 10 wherein the β-aminomaleonitrile is α-methoxymethyleneamino-β-aminomaleonitrile.

14. The process of claim 10 wherein the β-aminomaleonitrile is α-cyclohexyloxymethyleneamino-β-aminomaleonitrile.

15. The process of claim 10 wherein the β-aminomaleonitrile is α-dodecyloxymethyleneamino-β-aminomaleonitrile.

References Cited

UNITED STATES PATENTS 2,534,331   12/1950   Woodward _____ 260—309

OTHER REFERENCES

Cook et al., Chem. Abst., vol 44, columns 3907–8 (1950). QD1.A51.

Yamada et al., Chem Abst., vol. 72, No. 43734w (1970). QD1.A51.

Yamada et al., Chem. Abst., vol 74, No. 125693n (1971). QD1.A51.

NATALIE TROUSOF, Primary Examiner

U.S. Cl. X.R.

252—193; 260—464, 465 E, 465.5 R

UNITED STATES PATENT OFFICE
CERTIFICATE OF CORRECTION

Patent No. 3,778,446            Dated December 11, 1973

Inventor(s) Frank J. Weigert

It is certified that error appears in the above-identified patent and that said Letters Patent are hereby corrected as shown below:

Col. 2, line 3 - top atom in ring of formula IV should be "N".

Col. 3, line 50 - correct spelling of "products".

Col. 4, line 2 - change "employed" to "improved".

Col. 5, line 19 - "20" should be "200".

Col. 5, line 51 - "11.254" should be "11.25".

Col. 8, line 39 - correct spelling of "trifluorohexyloxy".

Col. 8, line 44 - correct spelling of "nitrohexyloxy".

Col. 8, line 45 - correct spelling of "β-phenoxyethoxy".

Col. 8, line 46 - correct spelling of "β-methoxy [β-ethoxy] ethoxy".

Col. 8, line 64 - insert ", wherein".

Col. 10, line 2, claim 11 - "α-allyloxymethyleneamino" should be "α-ethoxymethyleneamino".

Signed and sealed this 9th day of April 1974.

(SEAL)
Attest:

EDWARD M.FLETCHER,JR.
Attesting Officer

C. MARSHALL DANN
Commissioner of Patents